United States Patent [19]

Shepheard

[11] Patent Number: 4,620,339
[45] Date of Patent: Nov. 4, 1986

[54] COMBINED PASSENGER LOADING BRIDGE AND UTILITIES CONDUIT BETWEEN AIRPORT TERMINAL AND PARKED AIRCRAFT

[75] Inventor: Thomas E. Shepheard, Norfolk, Va.

[73] Assignee: Air-A-Plane Corporation, Norfolk, Va.

[21] Appl. No.: 798,960

[22] Filed: Nov. 18, 1985

[51] Int. Cl.⁴ ............................................. E01D 1/00
[52] U.S. Cl. .................................. 14/71.5; 191/12 R; 248/49; 98/2.15; 98/40.19; 98/DIG. 7; 138/114; 237/12.3 R
[58] Field of Search ............ 14/71.5; 191/12 R, 12 C; 244/114 R; 248/49; 165/41, 42, 83, 137; 285/62, 137.1, 302; 98/2.05, 2.08, 2.14, 2.15, 40.04, 40.05, 40.19, DIG. 7; 138/38, 114; 237/12.3 R

[56] References Cited

U.S. PATENT DOCUMENTS

| | | | |
|---|---|---|---|
| 3,284,036 | 11/1966 | Nansel | 248/49 |
| 3,399,545 | 9/1968 | Anderson et al. | 285/61 X |
| 3,433,889 | 3/1969 | De Vries, Jr. | 191/12 R X |
| 3,521,316 | 7/1970 | Adams et al. | 14/71.5 |
| 3,779,003 | 12/1973 | Boissevain et al. | 248/49 X |
| 3,859,481 | 1/1975 | Sprague | 14/71.5 X |
| 4,311,293 | 1/1982 | Tenniswood | 248/49 |
| 4,526,090 | 7/1985 | Maier | 14/71.5 X |
| 4,572,550 | 2/1986 | Harder | 14/71.5 X |

FOREIGN PATENT DOCUMENTS 2415771 9/1979 France .......................... 14/71.5

Primary Examiner—Stephen J. Novosad
Assistant Examiner—John F. Letchford
Attorney, Agent, or Firm—Nies, Webner, Kurz & Bergert

[57] ABSTRACT

An extensible loading bridge for aircraft having an inboard end connected to a terminal and an outboard end adapted for connection to a parked aircraft. A heat exchanger on the outboard end supplies warm or cold air to the aircraft. Hot or cold liquid is supplied to the outboard heat exchanger from a source at the terminal end of the bridge and extensible supply and return lines convey the hot or cold glycol to or from the outboard heat exchanger.

5 Claims, 6 Drawing Figures

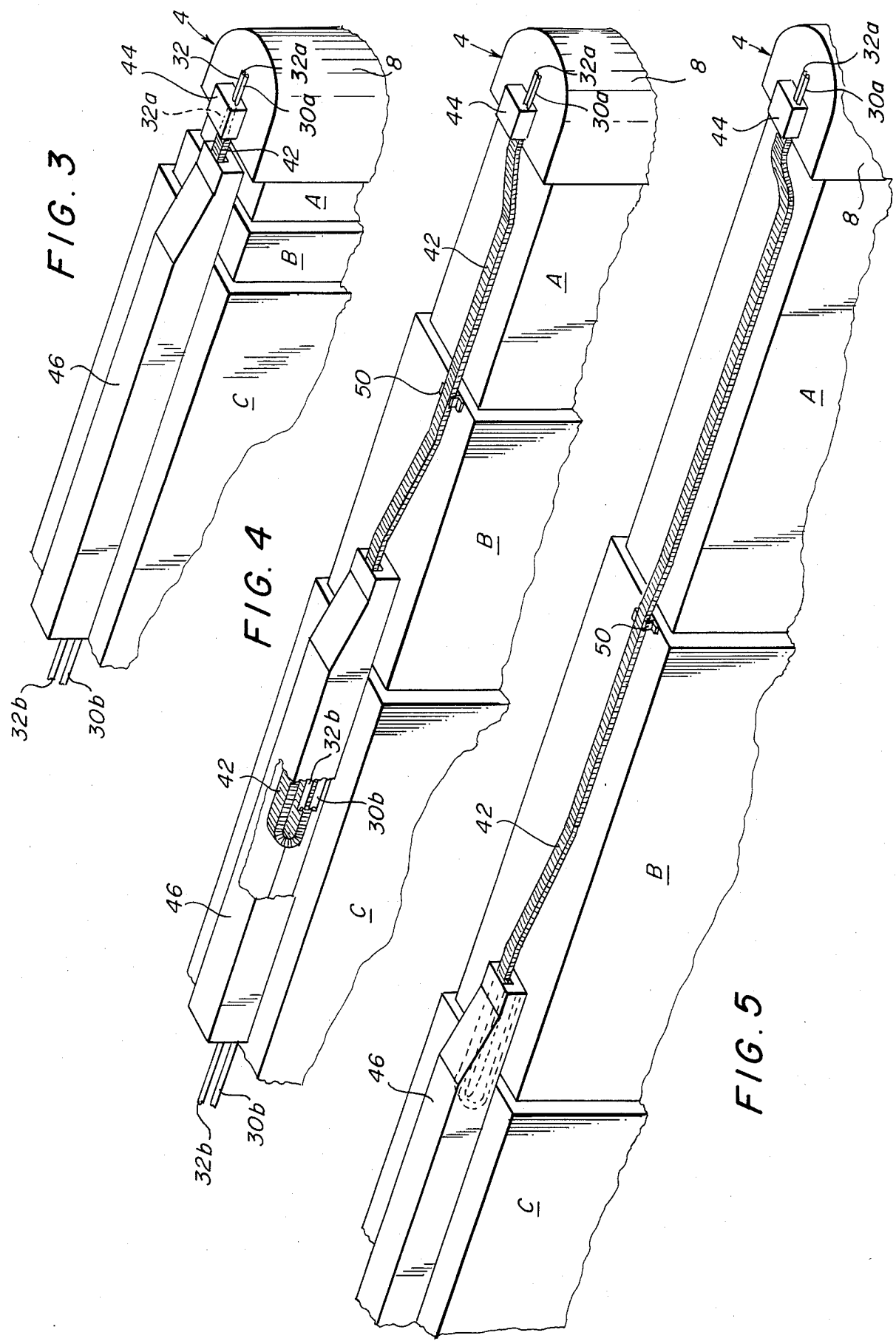

COMBINED PASSENGER LOADING BRIDGE AND UTILITIES CONDUIT BETWEEN AIRPORT TERMINAL AND PARKED AIRCRAFT

FIELD OF INVENTION

Bridges, gangways with lift means, attached to fixed structure at first end with cover and provision to fit vehicle at second end in class 14, subclass 71.5; or electricity, transmission to vehicles, flexible extensions in class 191, subclass 12 R.

BACKGROUND

In airports where bridges are used for passengers to pass from a terminal to a parked aircraft, various schemes have been devised for piping air, hot or cold, from an air heater or cooler on the ground, or in the terminal, to an aircraft. These heating and/or cooling units conventionally include piping for transmitting the hot or cold air from a source at the terminal end of the bridge to the aircraft and because a large volume of air needs to be piped, the piping is of large cross section; and because the bridges are extensible, the piping must be correspondingly extensible. Telescoping pipes have been used, but difficulties are encountered in sealing the joints between the telescoping sections and if the piping is bent or cocked, the joints tend to bind. Flexible hoses suspended in festoons from the telescoping bridge sections are subject to being run into by the many ground vehicles which swarm about a parked aircraft when it is being loaded or unloaded.

OBJECTS

One object of this invention is to provide a heat exchanger on the outboard end of an aircraft loading bridge, a source of hot or chilled liquid, preferably a water-glycol mix, at the terminal end of the bridge, and an extensible conduit having liquid supply and return lines running between the source at the terminal and the heat exchanger on the outboard end of the bridge. Because of the capability of some liquids, such as glycol, for carrying a large amount of heat, the supply and return lines can be of small diameter and can be incorporated in an extensible system mounted entirely on the top of the loading bridge, without utilizing telescoping pipe joints which need sealing, and without festoons of flexible pipes or hoses hanging from the loading bridge when the latter is retracted. Heated or cooled air exiting from the outboard heat exchanger can be fed to a parked aircraft via a flexible pipe which may be of large diameter so as to handle a large volume of comparatively slow moving air, but which is so short in length as to be easily manipulated and not likely to be run into by ground support vehicles, such as fuel tank trucks, and food supply and baggage-handling vehicles.

To accomplish the afore-stated broad objectives, it is intended now to provide a liquid conducting system which is supported on top of a telescopically extensible loading bridge and which consists of liquid supply and return conduits formed of flexible tubes for those portions of their lengths which extend from a heat exchanger at the terminal and of the system to part-way to the outboard end of the bridge, and rigid tubes which extend the remainder of the distance to the heat exchanger at the outboard end of the bridge, wherein the flexible tubes are encased within a flexible armored carrier characterized by a capability of being looped-back 180° on itself, and an elongate fixed casing which extends along the length of the outermost section of the bridge and which houses tne outboard end of the looped-back portion of the flexible carrier and the flexible portions of the supply and return conduits; and by anchoring the free end of the flexible carrier to an inner end portion of the casing, the length of the looped-back portion of the flexible carrier (and hence the amount of slack taken up) is controlled by the extension and retraction of the bridge sections.

As previously stated, the part of the liquid conducting system which runs from the inboard hot or chilled liquid sources is constituted by flexible supply and return conduits and the part of the system which runs from the outboard heat exchanger inwardly is constituted by rigid conduits. A further object is to connect the flexible and rigid portions of these conduits at the inboard end of the casing so that the rigid conduits extend for practically all the length of the casing, thereby reducing the needed length of the flexible carrier and flexible supply and return conduits.

These and other objects will be apparent from the following specifications and drawings in which FIG. 1 is a side elevation of a two-tunnel extensible loading bridge with the air heating and cooling system installed thereon;

FIG. 3 is a diagrammatic view illustrating the condition of the extensible portion of the heating and cooling liquid system with the three-tunnel loading bridge fully retracted;

FIG. 4 is a view similar to FIG. 3 but showing the condition of the part of the bridge about half-way extended; and, FIG. 5 is a view similar to FIG. 4 but showing the positions of the the loading bridge fully extended; and, FIG. 6 is a broken-away perspective showing the connections at the inboard end of the casing.

Figure 1:
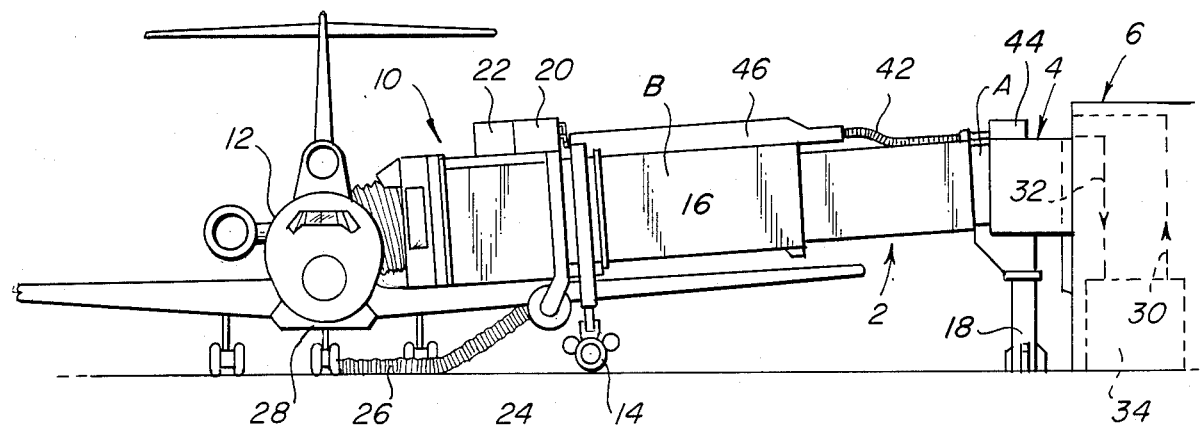
Figure 2:
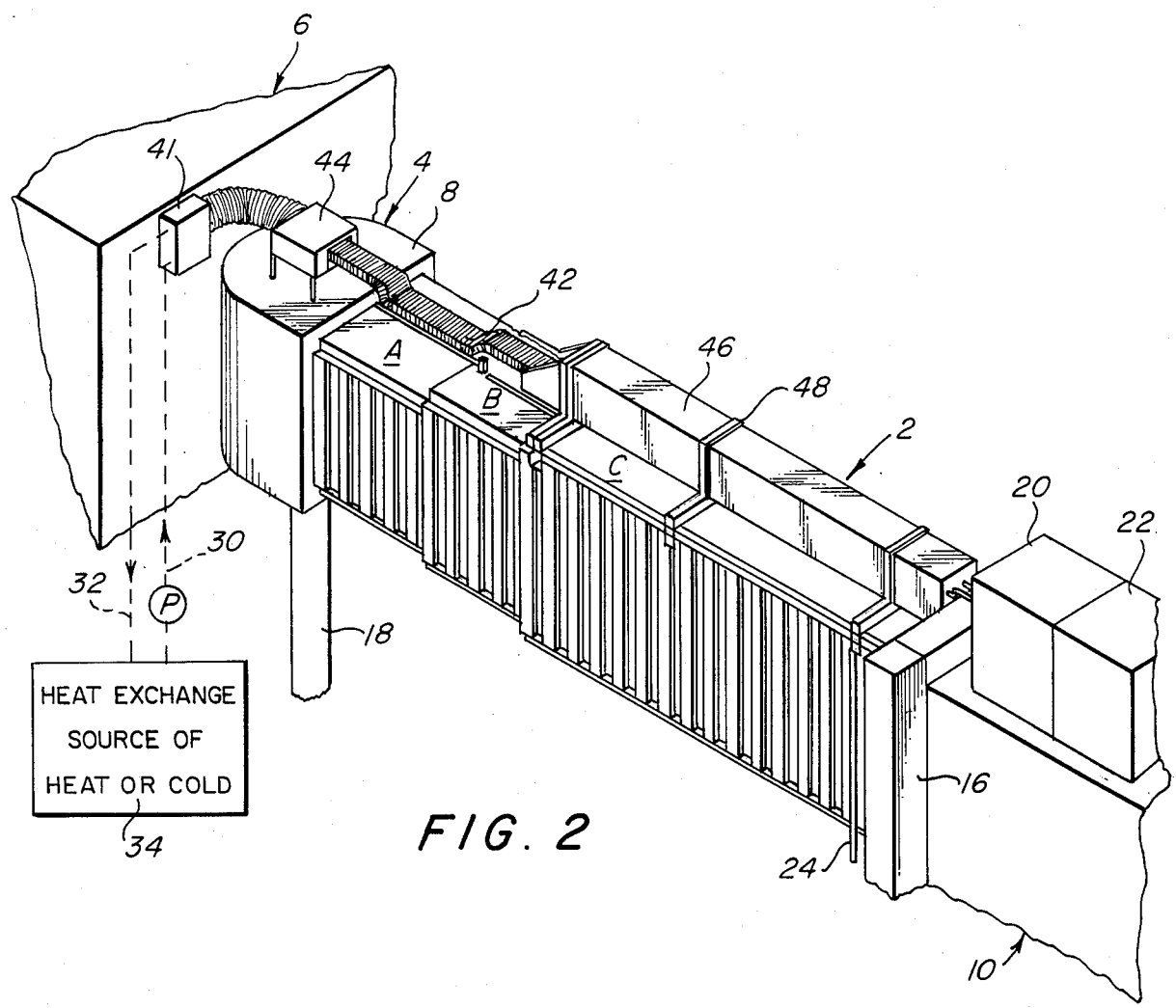
FIG. 2 is a diagrammatic perspective view of a three-tunnel bridge with the heating and cooling system thereon, looking towards the terminal.
Figure 6:
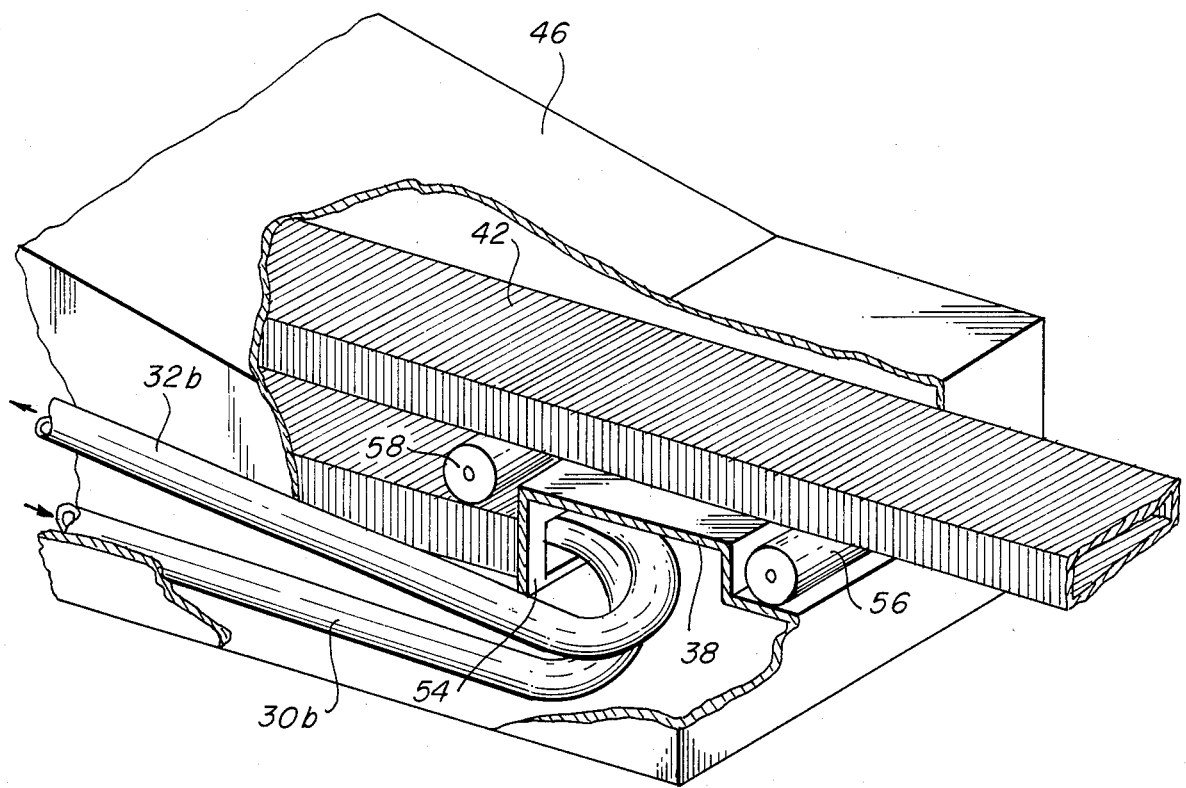

Referring now to the drawings in which like reference numerals denote similar elements, extensible boarding bridge 2 is well known. The two-tunnel bridge shown in FIG. 1 consists of an inboard tunnel A and an outboard tunnel B. In FIGS. 2-5 the bridge consists of an inboard tunnel A, an intermediate tunnel B and an outboard tunnel C, these tunnels being telescopically extensible and retractable. The inboard end 4 of the bridge is connected to a terminal rotunda 6, diagrammatically illustrated, by means of a pivoted housing 8 and the outboard end 10 of the bridge is connected to a parked aircraft 12. Wheels 14 support jacks 16 on the outboard tunnel C so that the latter may be moved back and forth or from side to side to reach the parked aircraft. A post 18 supports the inboard end of the bridge. The bridges, as thus far described, are conventional. The invention is as follows:

On top of the outboard tunnel C of the bridge are a heat exchanger 20 through which air is blown by fan 22, the heated or cooled air passing from the heat exchanger 20 via a pipe 24, and flexible tube 26 to a connection 28 on the aircraft fuselage. Heat transfer fluid, such as a water-glycol mixture is transferred between the heat exchanger 20 on the outboard end of the bridge and a heat exchanger 34 at the terminal, which is the source of hot or chilled liquid. When operating in the aircraft heating mode, the liquid flowing through the supply conduit 30 is hot and the heat extracted there-from in heat exchanger 20 is driven by fan 22 into the aircraft via pipe 24 and flexible hose 26, whereas when operating in the aircraft cooling mode, the heat extracted from the air fed to the aircraft is carried by the liquid through the return line 32 to the heat exchanger 34 at the terminal. The flexible portions 30a and 32a of the liquid supply and return lines 30 and 32 are contained within and protected by a flexible armored carrier 42. There are a number of such carriers available on the open market, the "Amflex" type referred to hereinbefore being one example. The inboard end is anchored to a junction box 44 on top of the pivoted housing 8 for the inboard end of the bridge and the outer end portion of the length of the carrier is doubled back upon itself (FIGS. 3, 4 and 5) and anchored to a plate 54 in a hollow casing 46 which overlies the outermost section of the telescoping bridge and which extends over part of the intermediate bridge section B. The flexible armored carrier 42 lies on top of the innermost bridge section A and is supported by roller 56 in a guide 50 and another roller 56 in casing 46. The outer ends of the flexible portions 30a and 30b of the liquid supply and return lines are connected by coupling, not shown, on a plate 54 to rigid pipes i.e., pipes 30b and 32b of the liquid supply and return lines, these rigid portions being supported within the casing 46 and having their outboard ends connected by couplings (not shown) to the heat exchanger 20.

In operation, assuming the aircraft is relatively near the terminal and the tunnels have been telescoped together, the outer end portion of the flexible armored carrier 42 containing flexible portions 30b and 32b within will have been doubled back beneath itself to the position illustrated in FIG. 3. Assuming the system is in its aircraft heating mode, the hot liquid will be pumped to the heat exchanger 20 and back to the heat exchanger 34 at the terminal via the return pipe portions 32b and 32a. When the telescoping sections of bridge 2 are extended for use with an aircraft that is parked somewhat farther away from the terminal than in the condition previously described, then the loop of the doubled-under portion of the flexible armored carrier will have moved inwardly towards the terminal to provide the extra distance needed to reach the parked aircraft.

In addition to the glycol supply and return lines, the flexible armored carrier 42 and the casing 46 will normally be used to accommodate power and communication cables and lines running from the terminal to the outboard end of the bridge where they will be connected to a parked aircraft.

It will be understood that two or more extensible loading bridge members may be used and, in fact, in the example of FIGS. 2-5, there are disclosed three such members; and electrical power and communication lines would normally be disposed within the flexible tube and continued from the outboard end thereof through the casing to the parked aircraft. Also, heat-transmitting liquids other than glycol may be used, although glycol is admirably suited for present purposes because of its high boiling point and inexpensive availability.

I claim:

1. In combination, an aircraft loading bridge having an inner end tunnel member attached to a terminal, an outer end tunnel member adapted to be connected to a parked aircraft and an extensible connection between said members,
   a flexible tube characterized by its ability to be bent back 180° upon itself to form a loop,
   said tube being supported on the bridge and having one end attached to the inner end tunnel member and having a looped-back outer end portion overlapping the outer end tunnel member of the bridge, the looped-back portion of the tube having a free end attached to the outer end tunnel member of the bridge,
   a liquid heat transmitting system including a first heat exchanger affixed at the terminal end of the inner tunnel member of the bridge and a second heat exchanger on the outer end tunnel member of the bridge,
   liquid supply and return conduits connected between said heat exchangers,
   said liquid supply and return conduits having flexible portions disposed within said tube and extending from end-to-end therein,
   and an air conduit having one end connected to the second heat exchanger and a free end adapted to be connected to the parked aircraft and a fan for propelling air through the second heat exchanger and the air conduit to the aircraft,
   said first heat exchanger providing a means for heating and cooling the liquid flowing through the supply and return conduits, and means for circulating the heated or cooled liquid through said conduits.

2. The combination claimed in claim 1, the liquid in said heating transmitting system including glycol.

3. The combination claimed in claim 1, said flexible tube being supported on top of said loading bridge members.

4. The combination claimed in claim 1, and an elongate housing on said outer end tunnel member, the looped-back portion of said flexible tube being disposed within said housing, said liquid supply and return conduits including rigid portions disposed within said housing and having inner end portions connected to the flexible portions of said liquid supply conduits and outer end portions connected to the second heat exchanger.

5. The combination claimed in claim 4, said housing extending along the length of the outer end member of the bridge and having an inner end portion overlapping the next adjacent bridge member.

* * * * *